Oct. 23, 1956 S. H. FILLION 2,767,861
CUSHIONING DEVICES
Filed May 25, 1953 2 Sheets-Sheet 1
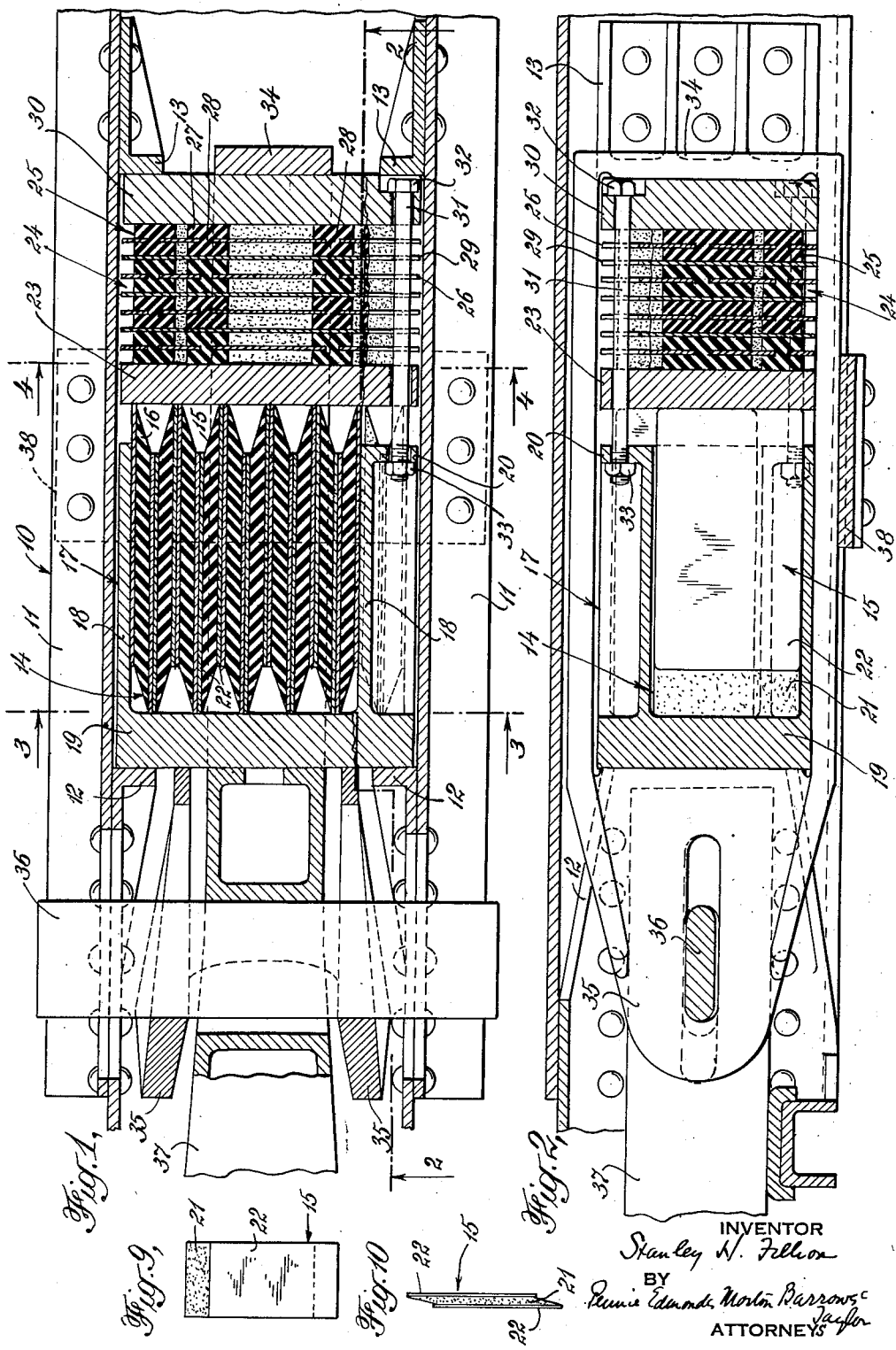

Oct. 23, 1956    S. H. FILLION    2,767,861
CUSHIONING DEVICES
Filed May 25, 1953    2 Sheets-Sheet 2
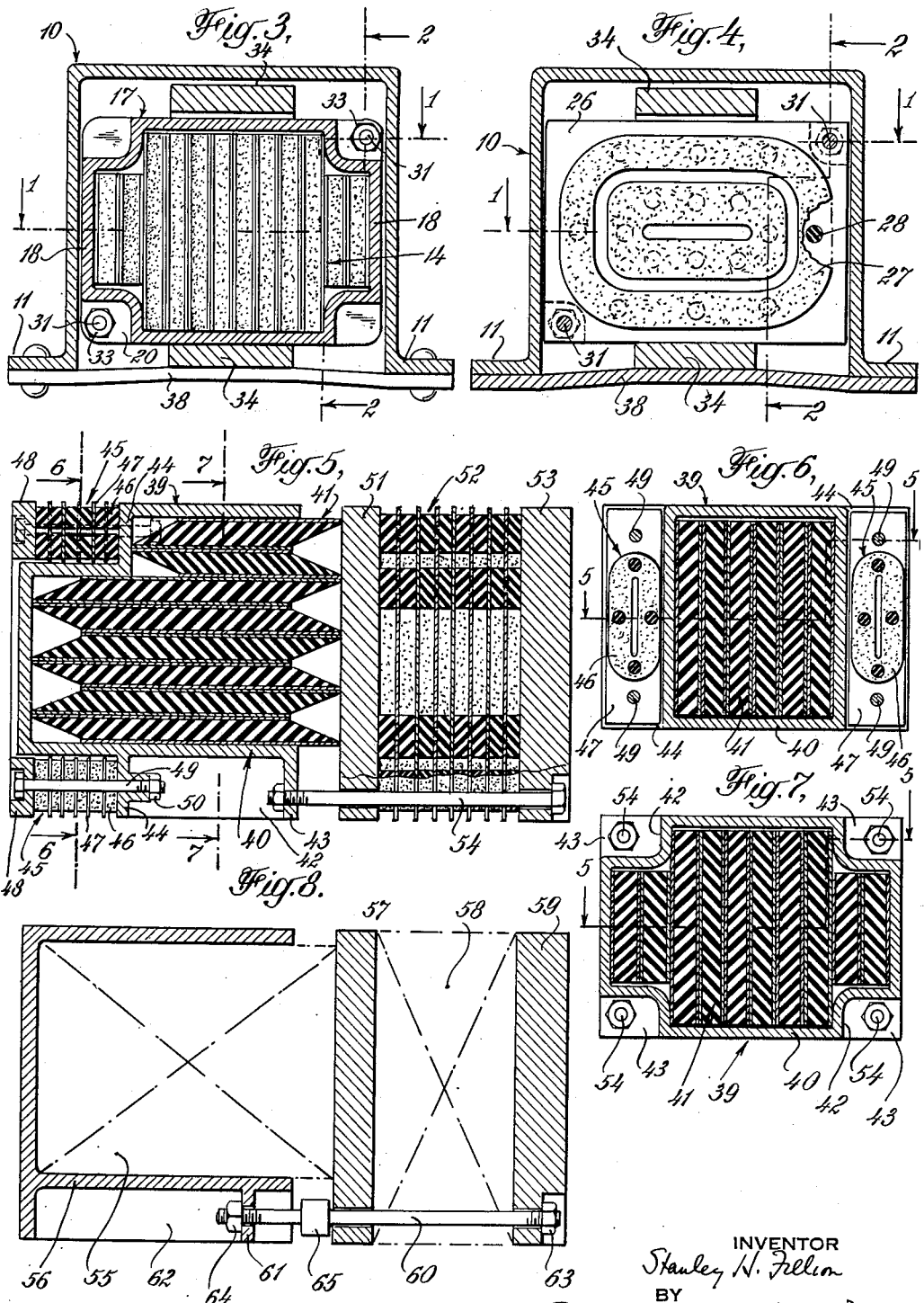
INVENTOR
Stanley H. Fillion
BY
Pennie Edmonds Morton Barrows Taylor
ATTORNEYS //United States Patent Office 2,767,861
Patented Oct. 23, 1956

2,767,861

CUSHIONING DEVICES

Stanley H. Fillion, Scarsdale, N. Y., assignor to Waugh Equipment Company, New York, N. Y., a corporation of New York Application May 25, 1953, Serial No. 356,980

5 Claims. (Cl. 213—47)

This invention relates to cushioning devices, in which rubber is employed as the resilient component, and is concerned more particularly with a novel cushioning device, in which use is made of the difference in cushioning effect between rubber subjected to compression and rubber subjected to shear. The cushioning device of the invention may be employed in different forms in a variety of applications and one form is suitable for use as a draft gear on railway rolling stock. As all the advantages of the invention are realized in a draft gear embodying the invention, such a gear will be illustrated and described in detail for purposes of explanation.

Draft gears employing rubber for the resilient component are in widespread use and, in most forms of such rubber draft gears, the rubber acts in compression to cushion shocks in both buff and draft applied to the couplers. Such a gear has the characteristic that, in the initial part of its action, it has a relatively long travel per increment of load, so that it offers little resistance to coupler movement and is softer in action than is desirable. When the load has reached a specific value, the gear becomes much stiffer, so that an increment of load produces a much smaller increment of travel than previously. A gear, in which the rubber is subjected to shear, differs from that of the gear above described, in that, in the initial part of its operation, an increment of load produces a smaller increment of travel. After a specific load has been imposed, the second gear functions much like the first, although there is a limit to the deflection in shear, to which the rubber may be subjected without damage, while rubber in compression can be subjected to much heavier loads without injury.

The present invention is directed to the provision of a novel cushioning device, in which advantage is taken of the different characteristics of rubber in compression and shear and which has a more nearly linear action than prior similar devices. The new device includes a pair of cushioning units, one of which contains rubber shear blocks and the other rubber springs, and these units operate in series with the load divided between them up to a point, after which additional load is applied to the spring unit only and further deflection of the shear block unit is prevented. The device includes means for subjecting the units to initial compression and such means may be so constructed that differential pre-compression may be applied to the two units.

For a better understanding of the invention, reference is made to the accompanying drawings, in which—

Fig. 1 is a horizontal sectional view on the line 1—1 of Figs. 3 and 4 through the new cushioning device;

Fig. 2 is a sectional view on the lines 2—2 of Figs. 1, 3, and 4;

Figs. 3 and 4 are sectional views on the lines 3—3 and 4—4 of Fig. 1, respectively;

Fig. 5 is a horizontal sectional view on the line 5—5 of Figs. 6 and 7 of a modified form of the device;

Figs. 6 and 7 are sectional views on the lines 6—6 and 7—7 of Fig. 5, respectively;

Fig. 8 is a schematic sectional view of another form of the new device; and

Figs. 9 and 10 are face and side edge views, respectively, of a shear block used in the device.

In the drawings, the cushioning device is shown in the form of a draft gear installed in a standard draft pocket 10 of a railway vehicle. The draft pocket lies between spaced longitudinal sills 11, 11 and is defined at its ends by pairs of front and rear stops 12, 13, respectively, which are riveted or otherwise attached to the sills.

The new draft gear in the form illustrated includes a shear block unit 14, which comprises a plurality of shear blocks 15, 16 partially enclosed within a housing 17. The housing has side walls 18 and a wall 19 closing one end, while the other end is open. At the intersecting edges of the side walls 18, the housing is formed with recesses closed by walls 20 at the open end of the housing.

Each shear block 15 comprises a rubber mass 21 and metal plates 22 bonded to opposite surfaces of the rubber mass and offset from each other. The shear blocks fit snugly within the housing, with one end of each block engaging the end wall 19 of the housing and the other end projecting out the open end of the housing. The blocks may stand on edge or lie flat and, in the construction shown, the blocks stand on edge and are so arranged that the metal plates on adjacent blocks are in full face-to-face contact. Shear blocks 16, which lie between the recessed portions of the housing, are of the same construction as blocks 15 but are narrower. The exposed ends of the shear blocks are engaged by a follower 23 and, when force is applied to the follower tending to move it toward the housing, the shear blocks resist such movement and their rubber masses are subjected to shear as the plates of the blocks in contact with the follower are moved into the housing. The side walls 18 of the housing are slightly longer than the plates of the shear blocks, and thus limit the deflection of the shear blocks and prevent direct compression of their plates 22.

A rubber spring unit 24, which includes a plurality of rubber springs 25, lies in line and in engagement with the shear block unit 14. Each rubber spring consists of a metal center plate 26 carrying concentric rubber rings 27 on each side of the plate, corresponding rings on opposite sides of the plate being connected by plugs 28 which pass through openings in the plate. The individual rubber springs 25 of the unit are separated from each other by flat metal divider plates 29 and a follower 30 lies at the end of the group of springs remote from follower 23.

The housing of the shear block unit 14 is connected to the follower 30 of the rubber spring unit 24 by bolts 31, which extend through openings in the walls 20 of the housing and in the followers 23 and 30 and lie in cutouts at the corners of the center plates and divider plates of the springs. The follower 30 has recesses in its outer face for the heads 32 of the bolts 31 and the nuts 33 on the bolts lie within the recesses in the side walls of the housing. By tightening the nuts 33, the shear block unit and the rubber spring unit may be subjected to precompression equally divided between the units.

The draft gear is encircled by a vertical yoke 34 having spaced arms 35 projecting forwardly from its front end and connected by a key 36 to the shank 37 of a coupler. The shank 37 bears on the outer face of the front end of the yoke and the shank, the yoke arms 35, and the sills 11 are slotted for reception of the key. The slots in the sills are sufficiently long to give the coupler and yoke the necessary freedom of movement. The yoke rests upon a carry plate 38, which is connected to the sills and spans the space beneath them.

In the operation of the new draft gear, the application of a force in draft to the coupler causes forward movement of the yoke 34 and compression of the draft gear against the front stops 12. The shear block unit and the rubber spring unit operate in series, and, under load, the shear blocks 15, 16 are moved into the housing, until follower 23 engages and is stopped by the side walls of the housing at the open end thereof. Thereafter, any further force applied to the gear is resisted only by the rubber spring unit. In a similar manner, a force in buff applied to the yoke compresses the units against the rear stops 13. When the units are precompressed, no cushioning action is provided by the gear until the applied force exceeds the force used in precompressing the units.

In some installations, it is desirable to avoid slack between the coupler and car sills through the draft gear. Such slack can be avoided, if the spacing between the opposed faces of the front and rear end members of the yoke is the same as that between the opposed faces of the front and rear stops, since, under such conditions, the draft gear can tightly engage both the yoke and the stops. Because of tolerances and inaccuracies in construction of the parts, it is difficult to maintain the equal spacings mentioned, but the presence of slack can be avoided by using the modified form of the new gear shown in Figs. 5, 6, and 7.

The modified gear includes a shear block unit 39 comprising a housing 40 and a plurality of shear blocks 41 partially enclosed by the housing. At each intersection of a pair of side walls of the housing, the walls are cut away to form a recess 42, which is closed at its front end by a wall 43. At the closed end of the housing, the two recesses at the same side of the housing are connected so as to form a pocket extending from top to bottom of the housing and closed at the end remote from the closed end of the housing by a wall 44. A rubber spring unit 45 is seated in each pocket against the outer face of each wall 44, and each such unit comprises a plurality of rubber springs 46 separated by divider plates 47. A follower 48 is mounted against the outer face of each spring unit 45 and is held in position by upper and lower bolts 49 passing through the follower and spring unit and through openings in wall 44. The follower is recessed to receive the heads of the bolts and the nuts 50 on the bolts lie in the recesses between walls 43 and 44. By drawing up the bolts, the spring units 45 may be subjected to precompression and their overall length varied.

The ends of the shear blocks 41, which project out of housing 40, engage a follower 51, which lies at one side of a spring unit 52, which is similar to unit 24 and is made up of alternate rubber springs and divider plates. A follower 53 lies against the end of the spring unit remote from the housing and is connected to the walls 43 on the housing by bolts 54, which have heads seated in recesses in follower 53, lie within cutouts in the rubber springs and divider plates of unit 52, and extend through openings in follower 51 and walls 43.

In assembling either form of the new gear, the final operation involves turning the nuts on the bolts, until the nuts engage the housing snugly, after which the nuts are welded to the bolts, although lock nuts may be employed, if desired. At this time, the gear has an overall length greater than any pocket, in which it will be used, and, when it is to be installed in a pocket, it is compressed in a press, until the overall length of the gear is less than that of the pocket. A precompression block is then inserted between the nut on each bolt and the adjacent part of the housing and, when the pressure on the gear is released, the blocks are held in place by the nuts. The gear is then inserted in the yoke, the yoke is placed in the pocket, and the installation is then completed in the usual way. Initially, the gear is out of contact with the stops and yoke, but when the gear has been compressed once in service, the precompression blocks fall out and the gear expands and makes tight contact ordinarily with both the yoke and stops. However, if the length of the pocket differs from the length of the yoke, the modified gear of Fig. 5 may be used to provide the differential expansion necessary.

In some instances, it may be desired to subject the shear block unit and the spring unit of the new cushioning device to different amounts of precompression and, for this purpose, the construction diagrammatically illustrated in Fig. 8 may be employed. In the Fig. 8 form of the gear, the area 55, in which the diagonals are shown in dottted lines, indicates a shear block similar to unit 14 and made up of shear blocks partially enclosed with a housing 56. The projecting ends of the shear blocks engage a follower 57, which lies against one side of a rubber spring unit indicated by the area 58, in which the diagonals are shown in dotted lines, the spring unit being similar to unit 24. A follower 59 lies against the outer face of the rubber spring unit and is connected to the housing by tie rods 60, which pass through openings in follower 59, lie within cutouts at the corners of the spring unit 58, and extend through openings in follower 57. The rods also pass through openings in the walls 61 within the recesses 62 at the corners of housing 56. Each tie rod is threaded at each end, and it is provided with a nut 63 at its outer end lying within a recess in follower 59 and a nut 64 at its inner end within a recess 62 in the housing. Between the housing 56 and follower 57, each tie rod is provided with an enlargement 65. By means of the nuts 63 on the tie rods, the spring unit 58 may be held compressed against the enlargements 65 on the tie rods and subjected to precompression without any load being imposed on the shear block unit 54. Thereafter, a smaller amount of precompression may then be applied to shear block unit 55 and maintained by nuts 64.

In the construction shown in Fig. 1, the gear is installed in the draft pocket with the shear block unit forward and the end wall of the housing engaged with the end of the coupler shank. This requires that the end wall of the housing have substantial thickness, since it receives the forces in buff transmitted through the coupler. If desired, the entire gear may be reversed within the yoke, so that the end wall of the housing lies in contact with the rear end of the yoke and the follower 30 lies at the front end in contact with the coupler shank. For a gear thus installed, the housing need not have so heavy an end wall, since the shocks in draft are not as great as those in buff.

I claim:

1. A draft gear for use within a yoke in a draft pocket having a front pair of stops and a rear pair of stops, which comprises a shear block unit, including a housing, a plurality of shear blocks seated at one end within the housing and having their other ends projecting out of the housing, and an internal follower having one face in contact with the exposed ends of the shear blocks and movable against their resistance into engagement with the housing, a rubber spring unit including a group of rubber springs in contact at one end with the other face of the internal follower and an external follower in contact with the other end of the group of springs, and resilient means mounted on the outside of the housing adjacent the end remote from that, at which the shear blocks project.

2. A draft gear for use within a yoke in a draft pocket having a front pair of stops and a rear pair of stops, which comprises a shear block unit, including a housing having a closed end and a pair of seats on the outside of the housing adjacent the closed end, a plurality of shear blocks partially enclosed by the housing and having ends seated on the housing and ends exposed beyond the housing, and an internal follower engaging the exposed ends of the shear blocks, a rubber spring unit including a group of rubber springs in contact at one end with the other face of the internal follower and an external follower in contact with the other end of the group of springs, resilient units seated on the external seats on the housing, and means for varying the overall length of said resilient units.

3. A draft gear for use within a yoke in a draft pocket having a front pair of stops and a rear pair of stops, which comprises a shear block unit, including a housing having a closed end and a pair of seats on the outside of the housing adjacent the closed end, a plurality of shear blocks partially enclosed by the housing and having ends seated on the housing and ends exposed beyond the housing, and an internal follower engaging the exposed ends of the shear blocks, a rubber spring unit including a group of rubber springs in contact at one end with the other face of the internal follower and an external follower in contact with the other end of the group of springs, means engaging the housing and external follower for applying compression to at least one of said units, a resilient unit seated on each of the external seats on the housing, and means for varying the overall length of respective resilient units.

4. A draft gear for use within a yoke in a draft pocket having a front pair of stops and a rear pair of stops, which comprises a shear block unit, including a housing, a plurality of shear blocks seated at one end within the housing and having their other ends projecting out of the housing, and an internal follower having one face in contact with the exposed ends of the shear blocks and movable against their resistance into engagement with the housing, a rubber spring unit including a group of rubber springs in contact at one end with the other face of the internal follower and an external follower in contact with the other end of the group of springs, and tie rods connecting the housing and external follower, each tie rod having an enlargement engaging the internal follower, the tie rods being operable to compress the shear block and rubber spring units differentially.

5. A draft mechanism for use on railway rolling stock having a draft pocket with pairs of stops at the front and rear ends of the pocket, which comprises a yoke adapted to be attached to the coupler, a housing within the yoke having a closed end normally engaged with one pair of stops and the opposite end open, a plurality of rubber shear blocks removably mounted within the housing with one end in engagement with the closed end of the housing, the other end of each block normally projecting out of the open end of the housing, an internal follower within the yoke having one face in contact with the exposed ends of the shear blocks, the follower and housing being relatively movable against the resistance of the shear blocks, a rubber spring unit within the yoke having one end in contact with the other face of the internal follower, an external follower within the yoke in contact with the other end of the spring unit and normally engaged with the other pair of stops, and tie rods engaging the housing and the internal and external followers, the tie rods extending through openings in the housing and followers and having enlargements engageable with one face of the internal follower.

References Cited in the file of this patent

UNITED STATES PATENTS

| | | |
|---|---|---|
| 1,828,063 | Mussey | Oct. 20, 1931 |
| 2,126,707 | Schmidt | Aug. 16, 1938 |
| 2,165,375 | Heitner | July 11, 1939 |
| 2,186,267 | Page | Jan. 9, 1940 |
| 2,263,599 | Tucker | Nov. 25, 1941 |
| 2,535,197 | Dath | Dec. 26, 1950 |
| 2,555,431 | Withall | June 5, 1951 |
| 2,618,393 | Withall | Nov. 18, 1952 |